(12) United States Patent
Rubitschek et al.

(10) Patent No.: US 10,309,348 B2
(45) Date of Patent: Jun. 4, 2019

(54) MOTOR VEHICLE HEAT EXCHANGER SYSTEM

(71) Applicant: BENTELER AUTOMOBILTECHNIK GMBH, Paderborn (DE)

(72) Inventors: Felix Rubitschek, Paderborn (DE); Sven Przybylski, Paderborn (DE); Tobias Düpmeier, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 334 days.

(21) Appl. No.: 15/152,065

(22) Filed: May 11, 2016

(65) Prior Publication Data

US 2016/0334169 A1 Nov. 17, 2016

(30) Foreign Application Priority Data

May 12, 2015 (DE) .................. 10 2015 107 472

(51) Int. Cl.
*F02M 26/29* (2016.01)
*F28D 15/04* (2006.01)
(Continued)

(52) U.S. Cl.
CPC .............. *F02M 26/29* (2016.02); *B60H 1/20* (2013.01); *F01N 3/0205* (2013.01); *F01N 3/043* (2013.01); *F25B 39/022* (2013.01); *F28D 9/0037* (2013.01); *F28D 15/025* (2013.01); *F28D 15/0266* (2013.01); *F28D 15/0275* (2013.01);
(Continued)

(58) Field of Classification Search
CPC ....... F02M 26/29; F01N 3/043; F01N 3/0205; F28D 15/043; F28D 15/046; F28D 15/0266; F28D 15/025
See application file for complete search history.

(56) References Cited

U.S. PATENT DOCUMENTS 5,076,351 A * 12/1991 Munekawa ......... F28D 15/0233
165/104.14
8,056,616 B2 * 11/2011 Miyagawa ................ F01N 5/02
165/104.14
(Continued)

FOREIGN PATENT DOCUMENTS

DE 10 2010 031 561 A1 1/2012
DE 10 2010 042 068 4/2012
(Continued)

OTHER PUBLICATIONS

European Search Report dated Oct. 18, 2016 with respect to counterpart European patent application EP 16 16 8944.
(Continued)

*Primary Examiner* — Devon Russell
(74) *Attorney, Agent, or Firm* — Henry M. Feiereisen LLC

(57) ABSTRACT

A motor vehicle heat exchanger system includes a closed circuit for a working medium and an evaporator for evaporation of the working medium. The evaporator includes at least two evaporator cassettes having an exhaust gas channel formed between the evaporator cassettes. Each evaporator cassette includes a capillary structure and a liquid side and a vapor side. A medium feed is provided on the liquid side for liquid working medium. Each evaporator cassette includes a vapor collector.

15 Claims, 4 Drawing Sheets

(51) Int. Cl.
  *F28F 3/02* (2006.01)
  *F25B 39/02* (2006.01)
  *F28F 13/00* (2006.01)
  *F28F 13/18* (2006.01)
  *F28D 9/00* (2006.01)
  *F28D 21/00* (2006.01)
  *B60H 1/20* (2006.01)
  *F01N 3/02* (2006.01)
  *F01N 3/04* (2006.01)
  *F28D 15/02* (2006.01)
  *F28F 9/00* (2006.01)
  *F25B 23/00* (2006.01)
  *F28F 3/10* (2006.01)

(52) U.S. Cl.
  CPC ......... *F28D 15/0283* (2013.01); *F28D 15/04* (2013.01); *F28D 15/043* (2013.01); *F28D 21/0003* (2013.01); *F28F 3/025* (2013.01); *F28F 9/001* (2013.01); *F28F 13/003* (2013.01); *F28F 13/185* (2013.01); *F25B 23/006* (2013.01); *F28D 15/046* (2013.01); *F28D 2021/008* (2013.01); *F28D 2021/0064* (2013.01); *F28F 3/10* (2013.01)

(56) References Cited

U.S. PATENT DOCUMENTS

| | | | | |
|---|---|---|---|---|
| 9,494,063 | B2* | 11/2016 | Dupmeier | F01K 23/065 |
| 2007/0006994 | A1* | 1/2007 | Liu | F28D 15/043 |
| | | | | 165/104.26 |
| 2010/0282445 | A1* | 11/2010 | Mabuchi | F01N 5/02 |
| | | | | 165/104.26 |
| 2011/0005227 | A1* | 1/2011 | Toi | F01N 5/02 |
| | | | | 60/670 |
| 2011/0314799 | A1 | 12/2011 | Richter et al. | |
| 2012/0151938 | A1 | 6/2012 | Przybylski et al. | |
| 2012/0180990 | A1 | 7/2012 | Przybylski et al. | |
| 2012/0247736 | A1* | 10/2012 | Xiang | H01L 23/427 |
| | | | | 165/104.26 |
| 2013/0112375 | A1* | 5/2013 | Choi | F28D 15/043 |
| | | | | 165/104.26 |
| 2013/0167517 | A1 | 7/2013 | Duepmeier | |
| 2013/0206369 | A1* | 8/2013 | Lin | F28D 15/043 |
| | | | | 165/104.26 |
| 2016/0153317 | A1* | 6/2016 | Geskes | F01K 23/065 |
| | | | | 60/618 |

FOREIGN PATENT DOCUMENTS

| | | | | |
|---|---|---|---|---|
| DE | 10 2011 103 110 B4 | 8/2014 | | |
| EP | 2 799 805 | 11/2014 | | |
| JP | H03-19707 | 2/1991 | | |
| JP | 2008-255944 | 10/2008 | | |
| JP | 2009-062915 | 3/2009 | | |
| JP | 2011169514 A | * | 9/2011 | ............... F01N 5/02 |
| JP | 2014-062658 | 4/2014 | | |
| JP | 2015-087089 | 5/2015 | | |

OTHER PUBLICATIONS

Translation of European Search Report dated Oct. 18, 2016 with respect to counterpart European patent application EP 16 16 8944.

* cited by examiner

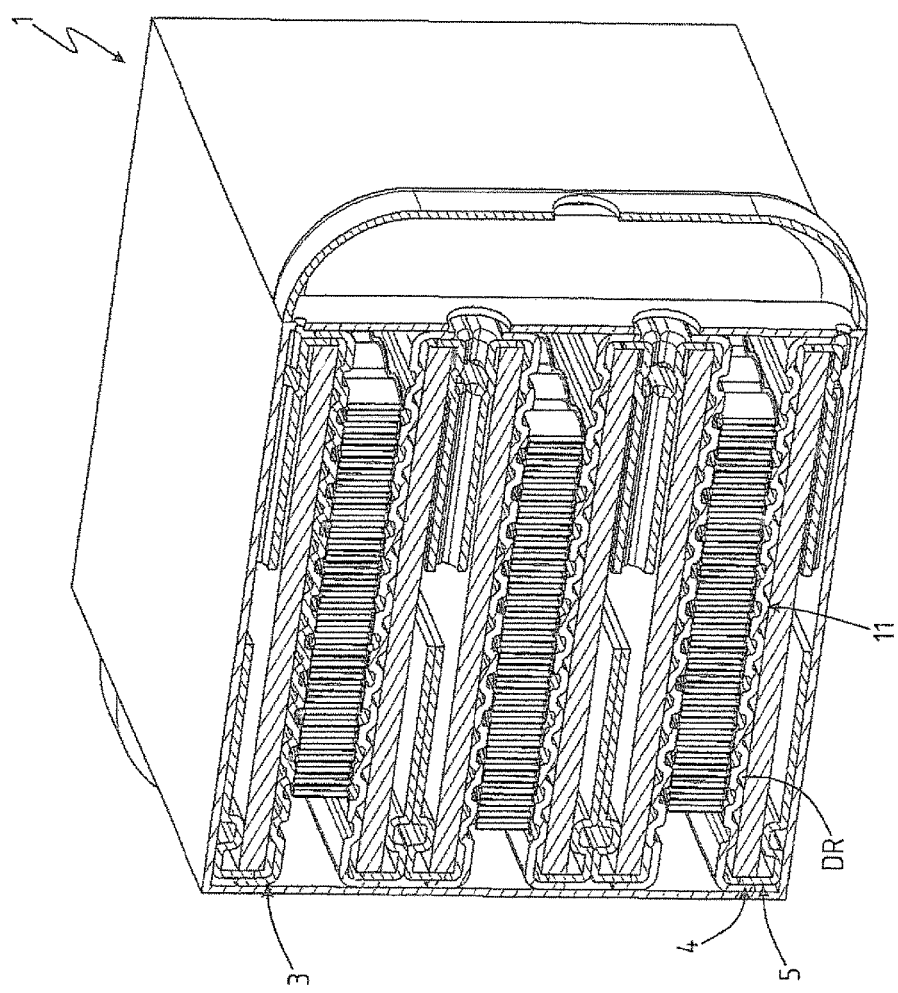

MOTOR VEHICLE HEAT EXCHANGER SYSTEM

CROSS-REFERENCES TO RELATED APPLICATIONS

This application claims the priority of German Patent Application, Serial No. 10 2015 107 472.9, filed May 12, 2015, pursuant to 35 U.S.C. 119(a)-(d), the disclosure of which is incorporated herein by reference in its entirety as if fully set forth herein.

BACKGROUND OF THE INVENTION

The present invention relates to a motor vehicle heat exchanger system.

The following discussion of related art is provided to assist the reader in understanding the advantages of the invention, and is not to be construed as an admission that this related art is prior art to this invention.

Against the backdrop of increasingly scarce fossil resources and legal requirements with regard to $CO_2$ emissions from motor vehicles, measures to increase the overall efficiency of motor vehicles are becoming ever more important. About two-thirds of the chemically bound energy to drive a motor vehicle is lost in the form of combustion heat and frictional heat. There have therefore been efforts for a long time to better utilize the exhaust gas heat and to use it to increase the efficiency of motor vehicles. In addition to concepts for direct energy recovery (thermoelectrics, Rankine), measures provide, in conjunction with the thermal management of motor vehicles for example, options to use waste heat for interior heating or the shortening of cold-start phases. Thus, the shortening of cold-start phases by an accelerated warm-up of lubricants, such as motor or transmission oil, can take place, whereby a reduction of friction loss can be obtained.

DE 10 2011 103 110 B4 discloses an exhaust gas system for an internal combustion motor of a motor vehicle with a circulation heat pipe. The exhaust gas system has an exhaust gas pipe, a condenser, and an evaporator, as well as lines connecting the condenser and the evaporator. Heat transport of the heat energy extracted from the exhaust gas takes place via a working medium. The evaporator is formed of an exhaust gas pipe, a capillary structure and a cladding tube. The capillary structure is constructed as a porous body between the exhaust gas pipe and the enveloping body, in which the working medium crosses over from a fluid state into a gas or rather vapor state when passing through the capillary structure.

The heat pipe works simply by introduction of heat without mechanical pumping of the working medium. This is possible through the use of a capillary structure in the evaporator, which compensates for the flow pressure loss of the working medium through the capillary pressure. The heat pipe is generally constructed concentrically with an internal gas guide or rather internal bypass. This leaves only a one-sided heat dissipation from the inside to the outside. The manufacture of tubular capillary structures also takes considerable effort.

It would therefore be desirable and advantageous to provide an improved motor vehicle heat exchanger system which obviates prior art shortcomings and which is simple in construction and lightweight while yet being reliable in operation.

SUMMARY OF THE INVENTION

According to one aspect of the present invention, a motor vehicle heat transfer system includes a closed circuit for a working medium, an evaporator configured to evaporate the working medium, the evaporator including at least two evaporator cassettes forming an exhaust gas channel therebetween, each evaporator cassette including a capillary structure, a liquid side, and a vapor side, a medium feed disposed in the liquid side for supply of liquid working medium, and a plurality of vapor collectors cooperating with the evaporator cassettes in one-to-one correspondence.

The motor vehicle heat transmission system has a closed circuit for a working medium. Integrated in the circuit is the evaporator which is arranged in the exhaust gas stream of the internal combustion engine of the motor vehicle and achieves transfer of heat in contact with the exhaust gas. The exhaust gas discharged from the internal combustion engine of the motor vehicle can be wholly or partly passed through an exhaust gas channel. The working medium is evaporated in the evaporator and can flow from there to a condenser arranged in the motor vehicle. There is a heat transfer with a consumer in the condenser, where the vaporous working medium is condensed and liquefied. The liquid working medium can be recycled in the evaporator via a return line.

According to the invention, the evaporator includes at least two evaporator cassettes, where an exhaust gas channel is formed between the evaporator cassettes. Each evaporator cassette has a capillary structure integrated into this as well as a liquid side and a vapor side. Liquid side and vapor side are separated by the capillary structure. A medium feed for liquid working medium is provided on the liquid side. Each evaporator cassette is assigned to a vapor collector for receiving and discharging the generated vaporous working medium.

Modularization and scaling is possible as a result of the cassette construction or plate-like construction. Furthermore, a large heat transfer surface can be realized in a compact space. The effective heat transfer surface can be varied via the size of the evaporator cassette. It is also possible to operate multiple evaporators or evaporator cassettes in parallel and thus to also configure the efficiency factor in certain operating points via the number of exhaust gas channels in addition to the performance.

The exhaust gas channel may also be part of a bypass of the exhaust gas stream of the internal combustion engine of the motor vehicle.

Exhaust gas enters via an exhaust gas inlet in the exhaust gas channel and exits via an exhaust gas outlet. Advantageously, the exhaust gas stream coming from the internal combustion engine of the motor vehicle is conducted separately over several exhaust gas channels entirely or partially by the evaporator. For this purpose, an exhaust gas feed is associated with the input side and an exhaust gas discharge with the output side.

The liquid side and the vapor side are separated from one another in the evaporator cassette by the capillary structure. The capillary structure is advantageously formed by a porous plate body.

According to another advantageous feature of the present invention, the capillary structure can be made of sintered material. Currently preferred is a manufacture of the capillary structure on the basis of metal.

In operation, the working medium passes from the liquid side through the capillary structure and thereby evaporates. The phase boundary between the liquid and vapor during operation of the evaporator takes place in the capillary structure, through which capillary pressure is built up, which causes or guarantees the circulation of the working medium. On the vapor side, the working medium exits from the capillary structure in the gaseous or vaporous state. From here, the vaporous working medium is discharged or forwarded in the circuit.

The production of a capillary structure is particularly advantageous. The capillary structure can be manufactured separately. Advantageously, the capillary structure can be sintered from loose metallic bulk powder. This allows different geometric configurations of the capillary structure. Furthermore, vapor channels can be integrated directly into the sinter form. Advantageously, the vapor channels necessary for vapor guidance are integrally formed in one piece in the capillary structure.

According to another advantageous feature of the present invention, the capillary structure can have formed therein vapor channels. Advantageously, the vapor channels are provided on the vapor side in a surface of the capillary structure facing the exhaust gas channel.

According to another advantageous feature of the present invention, each of the evaporator cassettes has a cassette housing which can be formed with vapor grooves on the vapor side. Such vapor grooves may be designed, for example, by beads in the bottom of the evaporator cassette.

The capillary structure may also be configured as metallic randomly oriented nonwoven fabric.

Advantageously, the evaporator or each evaporator cassette is associated with a vapor collection chamber in which vapor flowing from the evaporator or the evaporator cassette is collected and is fed from there to the condenser.

A motor vehicle heat exchanger system according to the present invention provides that the evaporator includes a plurality of evaporator cassettes. The evaporator cassettes may be interconnected and joined to each other in a modular manner so that a passage for exhaust, which comes from the internal combustion engine of the motor vehicle, can be formed respectively between adjacent evaporator cassettes. Accordingly, the exhaust gas channel or plurality of exhaust gas channels can be formed respectively between two adjacent evaporator cassettes joined to one another.

According to another advantageous feature of the present invention, heat transfer elements can be provided in the exhaust gas channel for enlarging the heat transfer surface in the exhaust gas channel(s). As a result, an increase of the efficiency of heat transfer from the hot exhaust gas to the working medium can be achieved. Advantageously, the heat transfer elements can be designed as ribs, webs or fins. In practice, a stainless steel plate lamella may be viewed as a particularly good heat transfer element for enlarging the heat transfer surface. Such heat transfer elements can promote the exhaust gas side heat transfer from the exhaust gas flow to the working medium.

An evaporator cassette can be configured as rectangular plate-shaped. A simple design may involve an evaporator cassette having two shell bodies joined to each other. The shell bodies form a cassette housing. The capillary structure can be incorporated into the interior of the evaporator cassette. This arrangement can be advantageous for production. This also applies to the weight and space required for the evaporator.

The evaporator cassette or the shell bodies may be made of a corrosion-resistant and/or highly thermally conductive material, in particular a metal, preferably of steel, especially a stainless steel.

According to another advantageous feature of the present invention, at least one of the shell bodies can be provided with a bead. It may be an inward or outward stamping in the surface of the shell body here. Such beads may be provided for stiffening or increasing the rigidity of the cassette housing. Likewise, such beads may be configured as connecting surfaces or flow channels.

According to another advantageous feature of the present invention, the at least one bead can be configured in the form of a circumferential sealing bead to border the liquid side of the evaporator cassette. The sealing bead can be a circumferential bead in a shell body (1st shell body) which is directed inwardly towards the capillary structure and contacts the capillary structure. The bead reaches the liquid side on the capillary structure for the device, optionally with integration of a temperature-resistant seal. In this way, the liquid side of the evaporator cassette is limited by the sealing bead. The intermediate space between the shell body and the capillary structure serves as a distribution space for the supplied liquid working medium.

According to another advantageous feature of the present invention, the at least one bead can form part of the medium feed for the liquid working medium. The medium feed may also be formed respectively by two beads, which are associated with each other so that a channel is formed for the medium feed between them.

According to another advantageous feature of the present invention, a medium distributor can be associated with an evaporator for the distribution of liquid working medium to the individual evaporator cassettes. The liquid working medium can be distributed to the medium feeds of the evaporator cassette via the medium distributor.

Furthermore, it may be provided that beads are also provided in the other shell body (2nd shell body) of an evaporator cassette. For two adjacent evaporator cassettes, the cassettes abut along the beads to each other and limit the exhaust gas channel. A distance between the evaporator cassettes is determined by the geometric design, in particular the depth or height of the beads, thus defining the size of the exhaust gas channel.

The capillary structure may be arranged in the evaporator cassette under incorporation of seals. Especially high temperature resistant seals are used here, particularly seals based on graphite. The seal is designed for high temperatures of more than 200° C.

The capillary structure and the seal(s) can be inserted loosely into the evaporator cassette and frictionally held via the shell bodies. The two shell bodies may be integrally joined to one another, as the other components of the heat exchanger, such as connecting lines and housing components, may be. The tightness of the heat exchanger cassette can be ensured just like the exhaust gas channel. For a cohesive connection, welding, laser welding, or soldering, such as furnace brazing can be used, for example, under vacuum. A plurality of joining points can be produced simultaneously by means of a furnace brazing process.

According to another advantageous feature of the present invention, an expansion tank can be arranged upstream of the evaporator for the working medium. Advantageously, the expansion tank can be integrated into the return line.

According to another advantageous feature of the present invention, the evaporator can be configured for equalization of pressure. The efficiency of the motor vehicle heat exchanger system according to the present invention can be further increased in this way. For this purpose, the evaporator and the expansion tank can be, advantageously, connected to each other via a pressure equalization line. Thereby, a lower pressure level can be ensured in the circulation. By equalizing the pressure between the evaporator and expansion tank, the working direction of the circuit can be influenced, especially in the start-up behavior.

Furthermore, stabilization of the temperature in the starting phase can therefore be possible. Also, a high temperature difference between the vapor line and condenser performance can be supported for an advantageous system.

The manufacturing process of a plate-shaped capillary structure is relatively simple compared to a cylindrical structure. The capillary structure is also sturdy thanks to its plate-shaped design. Particularly advantageously, the vapor channels can be introduced directly into the capillary structure in the sintering process. Another important advantage is that the sealing between the liquid side and the vapor side of the evaporator or evaporator cassette does not require a difficult fit. The design of the evaporator cassette according to the invention and in particular the capillary structure is therefore error-tolerant with respect to form and position deviations.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a cross-section through a variation of a heat exchanger according to the present invention.

DETAILED DESCRIPTION OF PREFERRED EMBODIMENTS

Figure 1:
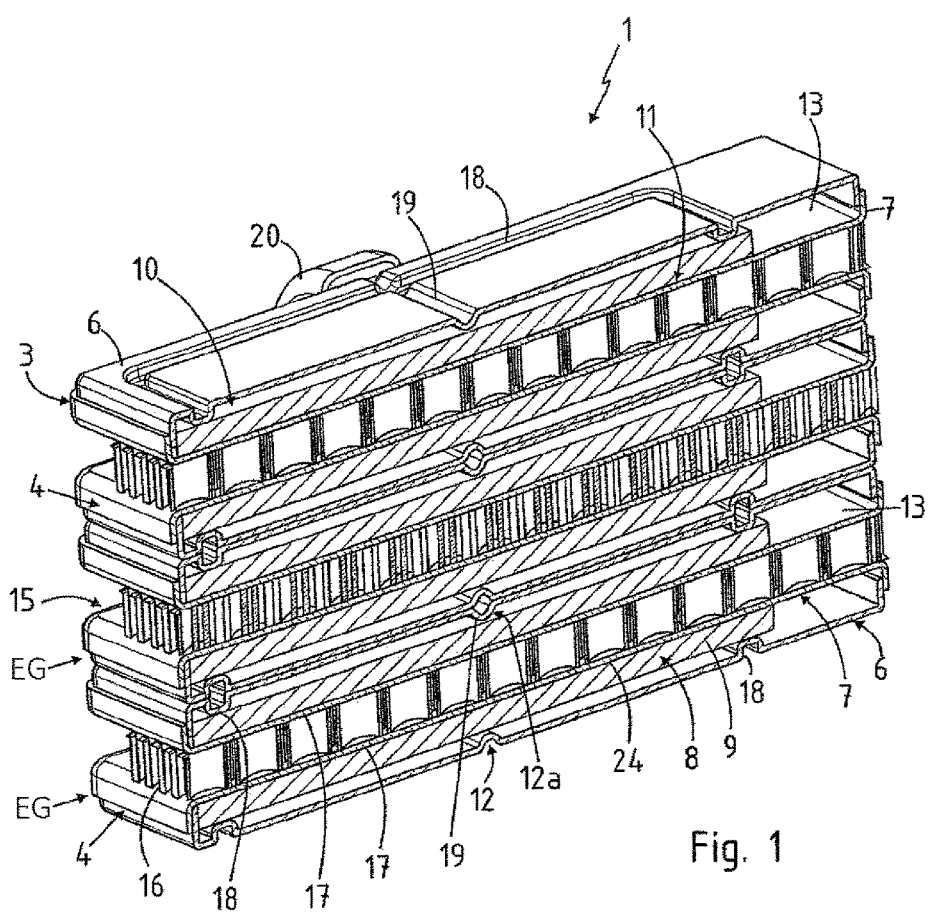
FIG. 1 shows a longitudinal section through a heat exchanger of a motor vehicle heat exchanger system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
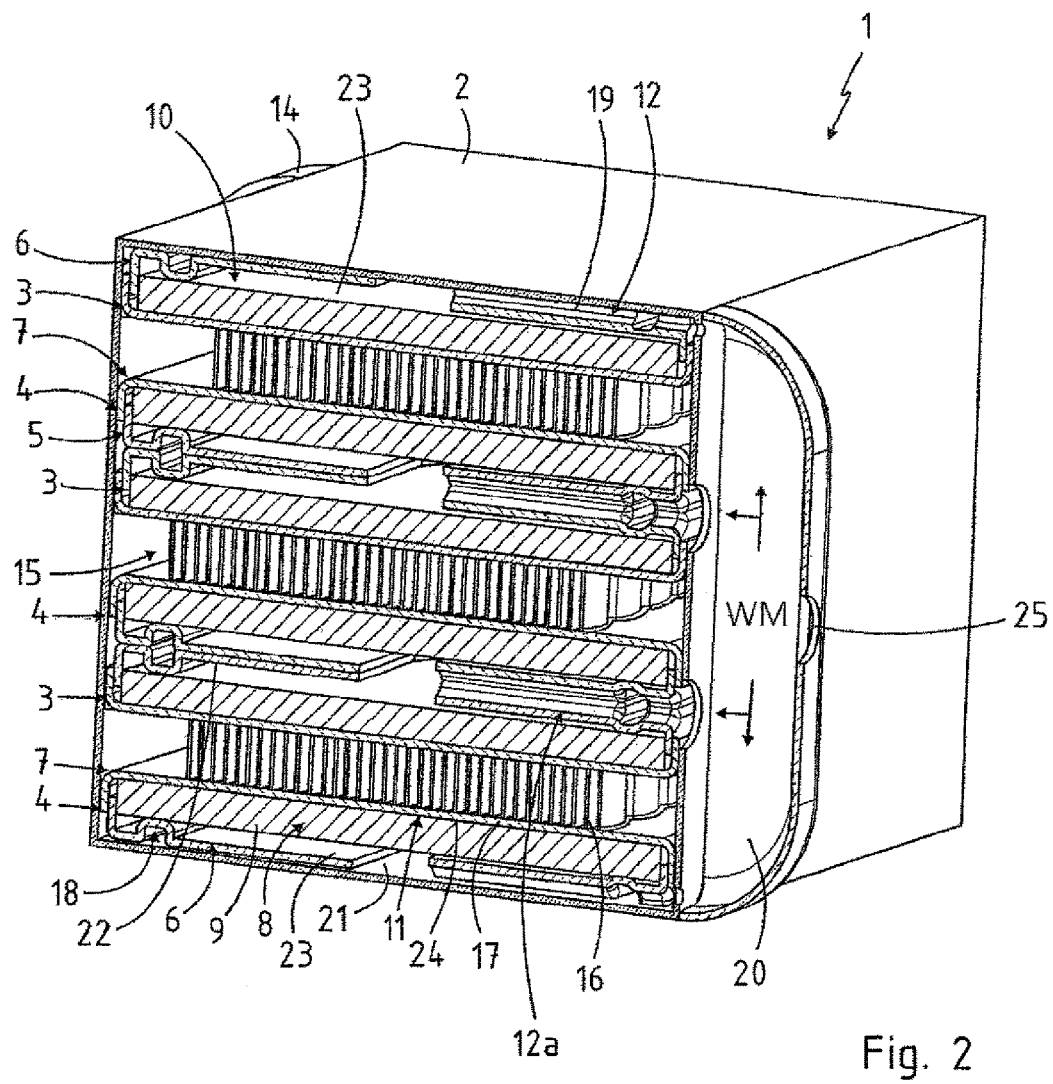
FIG. 2 shows a cross-section through a heat exchanger according to FIG. 1.

Turning now to the drawing, and in particular to FIGS. 1 and 2, there is shown an evaporator 1 of a motor vehicle heat exchanger system according to the present invention.

The motor vehicle heat exchanger system has a closed circuit for a working medium WM. The working medium WM, in particular, involves ethanol. A condenser, although not shown, is integrated in accordance with the present invention and includes the necessary connecting lines between evaporator 1 and the condenser. The condenser as well as an expansion tank for the working medium WM are part of the motor vehicle heat exchanger system. The expansion tank is connected upstream of the evaporator 1.

The evaporator 1 includes a plurality of evaporator cassettes 3, 4 arranged in a housing 2. In the embodiment shown in FIGS. 1 and 2, a total of six evaporator cassettes 3, 4 are provided. Each evaporator cassette 3, 4 has a cassette housing 5, which includes shell bodies 6, 7 joined together and made of stainless steel. The shell body 6 is also referred to as a first shell body and the shell body 7 is also referred to as a second shell body.

A capillary structure 8 is arranged in each evaporator cassette 3, 4 and incorporated between the shell bodies 6, 7. The capillary structure 8 integrated into an evaporator cassette 3, 4 is designed as a porous plate body 9 made of a sintered material, preferably a metallic material, for example.

A liquid side 10 and a vapor side 11 are each separated by the capillary structure 8 in an evaporator cassette 3, 4. On the liquid side 10, a medium feed 12, 12a is provided for the feeding of liquid working medium WM into the evaporator cassette 3, 4. Each evaporator cassette 3, 4 further has a vapor collector 13. In the vapor collectors 13, the vaporized working medium WM is collected in the evaporator cassettes 3, 4 and led to the condenser via a vapor line 14 illustrated in FIG. 2 into the circuit of the motor vehicle heat exchanger system.

An exhaust gas channel 15 is formed respectively between two evaporator cassettes 3, 4. Exhaust gas EG coming from the internal combustion engine of a motor vehicle is wholly or partly distributed to the exhaust gas channels 15 and passed through the evaporator 1. The exhaust gas EG flows into the exhaust gas channels 15 between the evaporator cassettes 3, 4 and achieves heat exchange in contact with the evaporator cassettes 3, 4. On the input side of the evaporator 1, an exhaust manifold, although not shown but integrated in accordance with the present invention, is provided, via which the exhaust gas EG is distributed to the exhaust gas channels 15. At the opposite end of the evaporator 1, the exhaust gas EG flows out and is drained from the system.

In the exhaust gas channels 15, heat exchanger elements 16 are provided to increase the heat transfer surface. In the heat exchanger elements 16, there are sheet lamella oriented in the longitudinal direction of the evaporator 1, each of which extends between flat sides 17 of two second shell bodies 7 and are joined therewith.

A circumferential sealing bead 18 directed inward is provided in the first shell body 6. The sealing bead 18 forms a pressure zone with which the first shell body 6 abuts the capillary structure 8. The sealing bead 18 is circumferential and borders the liquid side 10 in an evaporator cassette 3, 4 at an edge.

Furthermore, six beads 19 are respectively formed in the first shell bodies, which form part of the medium feed 12, 12a for the liquid working medium WM. For the respective upper evaporator cassette 3 and the lower evaporator cassette 4 exterior shown in FIG. 2, a respective bead 19 forms the medium feed 12. In the middle evaporator cassette 3, 4, two beads 19 arranged diametrically opposed to each other complete a circularly designed medium feed 12a. The beads 19 and the medium feeds 12, 12a correspond with a medium distributor 20, via which liquid working medium WM is fed and distributed to the evaporator cassettes 3, 4. The liquid working medium WM fed via the medium feeds 12, 12a ends up in the respective evaporator cassettes 3, 4 via inlet openings 21 in flat sides 22 of the first shell body 6.

The flat sides 22 of the middle evaporator cassette 3, 4 contact each other and are joined together.

The liquid working medium WM is fed to the evaporator cassettes 3, 4 via the medium distributor 20 and the medium feeds 12, 12a and enters on the respective liquid side 10 of the evaporator cassettes 3, 4. A distribution space 23 is formed between the first shell body 6 and the capillary structure 8, which is peripherally bordered by the sealing bead 18. The liquid working medium WM is distributed in the distribution space 23 to the liquid side 10 via the surface of the capillary structure 8. The working medium WM is evaporated in the evaporation cassettes 3, 4 by heat transfer from hot exhaust gas EG flowing through an exhaust gas channel 15. The working medium WM flows through from the liquid side 10 through the capillary structure 8 and crosses over from a fluid into a vaporous state. The phase boundary between the liquid and vapor during operation of the evaporator 1 takes place in the capillary structure 8, thereby forming a capillary pressure which causes and guarantees the circulation of the working medium WM. The vaporous working medium WM flows through vapor channels 24 on the vapor side 11 until it enters into a respective vapor collector 13. Each evaporator cassette 3, 4 has a vapor collector 13. The vaporous working medium WM is discharged from the vapor collectors 13 via a vapor outlet and the vapor line 14 and led to the condenser.

Figure 2A:
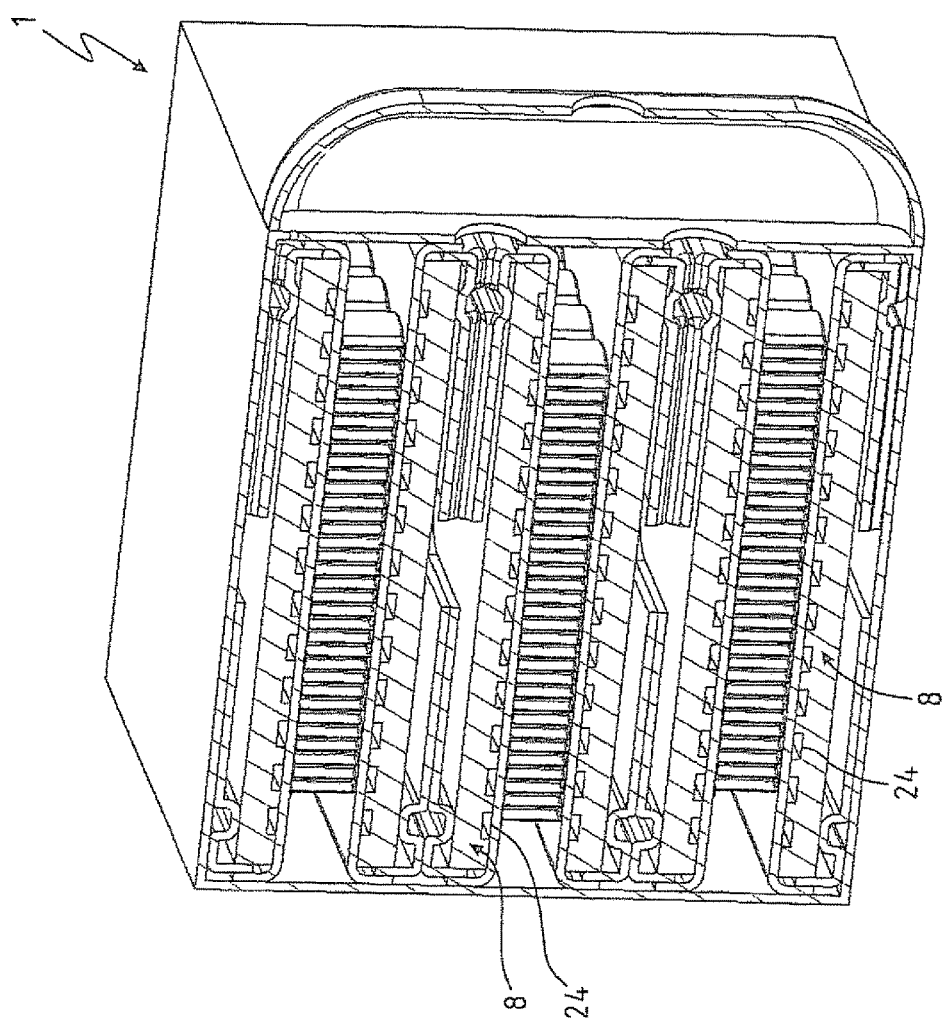
FIG. 2a shows a cross-section through the heat exchanger to depict a further detail of the heat exchanger.

The vapor channels 24 are shown in outline only in FIGS. 1 and 2. The vapor channels 24 extend on the vapor side 11 longitudinal and transverse to the capillary structure 8. FIG. 2a shows the capillary structure 8 having formed therein the vapor channels 24 on the vapor side 11 of the capillary structure 8.

Heat from the vaporous working medium WM is emitted to a consumer in the condenser. In particular, the condenser can be part of a heating device of the motor vehicle, such as the interior heating, for example. Also, the condenser can be part of a climate module of an air conditioner of the motor vehicle. A consequence of the heat release is that the vaporous working medium WM is liquefied in the condenser and flows preferably gravity-driven via a feed line, which is connected to a feed 25 of the medium distributor 20, back into the evaporator 1 or the evaporator cassette 3, 4.

FIG. 3 shows a cross-section of a heat exchanger 1, with each of the evaporator cassettes 3, 4 having a cassette housing 2 formed with vapor grooves DR on the vapor side 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A motor vehicle heat transfer system, comprising:
   a closed circuit for a working medium;
   an evaporator configured to evaporate the working medium, said evaporator comprising at least two elongated evaporator cassettes extending in a longitudinal direction and forming an exhaust gas channel therebetween, each said evaporator cassette including an elongated capillary structure extending in the longitudinal direction, and also a liquid side and a vapor side spaced from one another in a transverse direction;
   a medium feed disposed in the liquid side at a location between longitudinal ends of the cassettes for supply of liquid working medium; and
   a plurality of vapor collectors provided in one of the longitudinal ends of the evaporator cassettes.

2. The motor vehicle heat exchanger system of claim 1, wherein the capillary structure is formed by a porous plate body.

3. The motor vehicle heat exchanger system of claim 1, wherein the capillary structure is made of a sintered material.

4. The motor vehicle heat exchanger system of claim 1, wherein the capillary structure has formed therein vapor channels.

5. The motor vehicle heat exchanger system of claim 4, wherein the vapor channels are provided on the vapor side of the capillary structure.

6. The motor vehicle heat exchanger system of claim 1, wherein the evaporator cassettes each include a distribution space on the liquid side for the working medium.

7. The motor vehicle heat exchanger system of claim 1, wherein the evaporator cassettes each include two shell bodies joined to one another.

8. The motor vehicle heat exchanger system of claim 7, wherein at least one of the shell bodies is provided with a bead.

9. The motor vehicle heat exchanger system of claim 8, wherein the at least one bead is configured in the form of a perimetral sealing bead to border the liquid side of the evaporator cassette.

10. The motor vehicle heat exchanger system of claim 8, wherein the at least one bead forms part of the medium feed.

11. The motor vehicle heat exchanger system of claim 1, further comprising a housing, said evaporator cassettes being integrated in the housing.

12. The motor vehicle heat exchanger system of claim 1, further comprising a medium distributor connected to the evaporator.

13. The motor vehicle heat exchanger system of claim 1, further comprising heat transfer elements provided in the exhaust gas channel.

14. The motor vehicle heat exchanger system of claim 1, further comprising an expansion tank, arranged upstream of the evaporator, for the working medium.

15. The motor vehicle heat exchanger system of claim 1, wherein each of the evaporator cassettes has a cassette housing formed with vapor grooves on the vapor side.

* * * * *